Jan. 18, 1944.　　　P. L. CRITTENDEN　　　2,339,380
BRAKE CONTROL VALVE
Filed April 28, 1942
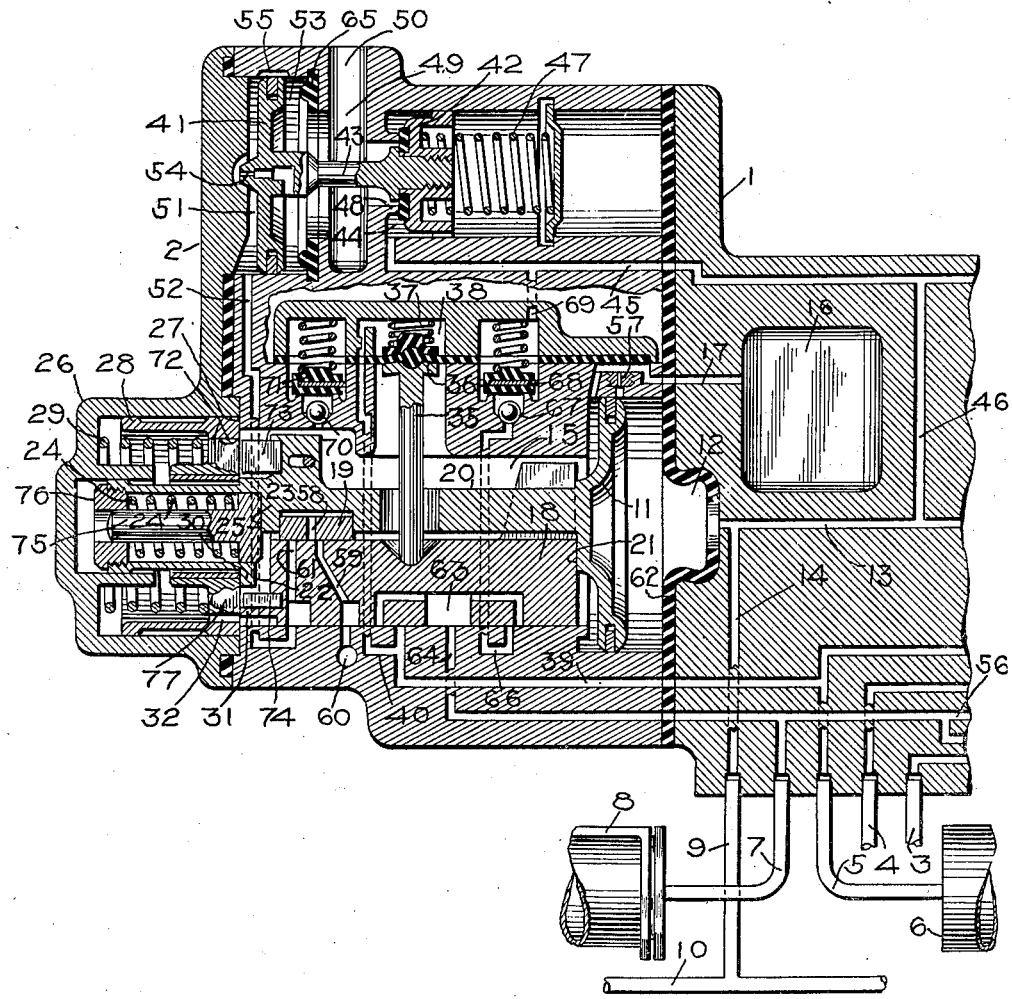
INVENTOR
Philip L. Crittenden
BY
ATTORNEY Patented Jan. 18, 1944

2,339,380

UNITED STATES PATENT OFFICE 2,339,380

BRAKE CONTROL VALVE

Philip L. Crittenden, Edgewood, Pa., assignor to The Westinghouse Air Brake Company, Wilmerding, Pa., a corporation of Pennsylvania Application April 28, 1942, Serial No. 440,767

10 Claims. (Cl. 303—42)

This invention relates to fluid pressure brakes and more particularly to the automatic type operative upon a reduction in brake pipe pressure to effect an application of brakes.

In Patent No. 2,031,213 issued to Clyde C. Farmer on February 18, 1936, there is disclosed a fluid pressure brake equipment embodying a brake controlling valve device which comprises a service portion and an emergency portion both of which are controlled from a brake pipe. The service portion is operative upon a service reduction in brake pipe pressure to effect a service application of brakes while both portions are operative upon an emergency reduction in brake pipe pressure to effect an emergency application of the brakes.

The emergency portion comprises a piston subject to the opposing pressures of the brake pipe and a quick action chamber, and said piston is arranged to be operated by a differential produced between said pressures upon a service rate of reduction in brake pipe pressure to move an auxiliary slide valve relative to a main slide valve to a service position. In service position of the auxiliary slide valve a communication is opened for venting fluid under pressure from the quick action chamber at the same rate as the brake pipe pressure is reduced, so as to thereby prevent further movement of these parts upon a service reduction in brake pipe pressure. The communication through which fluid under pressure is vented from the quick action chamber in service position of the auxiliary slide valve is so restricted however that the pressure in said chamber cannot reduce as fast as the brakepipe pressure reduces upon an emergency rate of reduction in brake pipe pressure, in which case a sufficient differential of pressures is attained on the piston to move same and the auxiliary slide valve relative to the main slide valve past the service position to an emergency position in which fluid under pressure is supplied from the quick action chamber to a brake pipe vent valve device for actuating same to effect a sudden local emergency reduction in brake pipe pressure for propagating the emergency action serially throughout a train. The emergency piston is also responsive to this emergency reduction in brake pipe pressure to move the main slide valve to a position for supplying fluid under pressure to a brake cylinder device for applying the brakes.

The emergency piston and auxiliary slide valve are so designed as to normally require about five-tenths of a pound per square inch differential between the pressures in the brake pipe and quick action chamber to move same to their service positions. A stabilizing spring associated with the piston is arranged to come into action about the time the auxiliary slide valve reaches service position to oppose movement of said piston and slide valve past service position. A differential between the pressures in the brake pipe and quick action chamber of about seven-tenths of a pound per square inch on the emergency piston is required to overcome this spring. Thus the brake pipe pressure must be reduced about one and two-tenths pounds per square inch below that in the quick action chamber in order to provide a sufficient differential on the emergency piston for moving said piston and the auxiliary slide valve past service position. The stabilizing spring therefore acts in conjunction with the quick action chamber vent in service position of the auxiliary slide valve to stabilize the piston and auxiliary slide valve against movement past service position to thus prevent an undesired emergency application of the brakes upon a service reduction in brake pipe pressure.

After an emergency valve device has been in use, it is possible that the static resistance to movement of the piston and auxiliary slide valve may become increased due to accumulations of foreign matter, lack of lubricant, use of improper lubricants, or for some other reason, and as a result a differential of pressures exceeding the five-tenths pound per square inch above mentioned might be required to start the piston and auxiliary slide valve moving toward service position upon a service reduction in brake pipe pressure. This is not liable to result in any undesired operation if the kinetic resistance to movement of these parts also increases sufficiently and as long as the differential in pressures required to start the parts moving does not exceed the one and two-tenths pounds above mentioned. However, if the kinetic resistance to movement of these parts remains sufficiently low when a relatively high differential is required to overcome static resistance, then after the parts start moving, the movement may be so sudden that sufficient inertia may be developed as to move the parts through service position to emergency position against the opposing action of the stabilizing spring and the effect of the venting of fluid under pressure from the quick action chamber in service position. If this should occur then an undesired emergency application of brakes will result from a service reduction in brake pipe pressure.

The principal object of the invention is therefore the provision of means for insuring intended operation of an emergency valve device upon a service reduction in brake pipe pressure even though the static resistance to movement of the emergency piston and auxiliary slide valve may become undesirably increased as above described.

Other objects and advantages will be apparent from the following more detailed description of the invention.

In the accompanying drawing the single figure is a diagrammatic view, mainly in section, of a portion of a fluid pressure brake equipment embodying the invention.

The portion of the brake equipment shown in the drawing is substantially the same as disclosed in the aforementioned patent, in view of which the following description of parts and operation will be limited only to that deemed necessary to a comprehensive understanding of the invention.

As shown in the drawing, the brake equipment comprises a pipe bracket 1 having one face upon which is mounted an emergency valve device 2 and having another face (not shown) for carrying a service application valve device (not shown) and which forms no part of the invention. Connected to another face of the pipe bracket are the following pipes:

Pipe 3 for connection with an auxiliary reservoir (not shown), pipe 4 for connection with a brake cylinder pressure retaining valve device (not shown), pipe 5 leading to an emergency reservoir 6, pipe 7 leading to a brake cylinder device 8, and pipe 9 which is connected to a brake pipe 10.

The emergency valve device 2 comprises a casing containing an emergency piston 11 having at one side a chamber 12 connected to the brake pipe 10 by way of passages 13, 14, and pipe 9, and having at the opposite side a valve chamber 15 communicating with a quick action chamber 16 through a passage 17.

The valve chamber 15 contains a main slide valve 18 and an auxiliary slide valve 19 mounted on and adapted to move relative to the main slide valve 18. The piston 11 is provided with a stem 20 having a recess in which the auxiliary slide valve 19 is disposed for movement with the piston. The main slide valve 18 is loosely disposed between a shoulder 21 formed on the back of piston 11 and a shoulder 22 provided on the end of the stem 20, and is arranged to be moved by engagement with one or the other of said shoulders according to the direction of movement of the piston.

A plunger 23 is slidably mounted in a suitable bore provided in the end of piston stem 20 and has a guide stem 75 which slidably extends through a bore provided in a nut 76 closing the end of the bore in said stem. A spring 24 is interposed between the nut 76 and plunger 23 and acts to urge said plunger into engagement with a shoulder 25 formed in the stem. This shoulder is so located that when the plunger 23 engages same, the outer face of the plunger is beyond the shoulder 22 but spaced from the end of the main slide valve 18 with these parts in their normal position shown in the drawing.

A removable cover 26 is secured to the emergency valve casing over the left-hand end of valve chamber 15. This cover is provided with a bore in axial alignment with the piston 11 and in which the cylindrical end of the piston stem 20 is slidably mounted. A cylindrical recess is provided in the cover 26 around the portion in which the end of the piston stem is mounted. This recess is of larger diameter than that of valve chamber 15 so as to provide a shoulder 27 on the casing. A movable stop 28 is slidably mounted in this recess and urged against shoulder 27 by a spring 29 also contained in said recess and interposed between said stop and the end wall of the recess.

The stop 28 is provided with an axial opening through which the end of the piston stem 20 freely extends and said stem has an annular collar 30 arranged to engage the stop 28 on the side opposite that engaged by spring 29. The main slide valve 18 is provided with a rearwardly extending finger 31 for engaging the stop 28. This engagement of the piston stem 20 and slide valve 18 with the stop 28 defines the normal positions of said piston and slide valve. The valve chamber 11 and the chamber at the left-hand side of the stop 28 are in constant communication through an opening 32.

A rocking pin 35 is interposed between one face of a flexible diaphragm 36 and the main slide valve 18 and is subject to the pressure of a spring 37 and of a fluid in a chamber 38 which is supplied with fluid under pressure from the emergency reservoir 6 by way of pipe 5 and passages 39 and 40. In practice, these pressures applied to the rocker pin 35 are transmitted to the main slide valve 18, when the emergency valve chamber 15 is vented, for holding the main slide valve seated against the pressure of fluid acting on its seating face as will be hereinafter brought out.

Associated with the emergency valve device is a brake pipe vent valve device comprising a piston 41 and a vent valve 42 operatively connected to said piston by means of a stem 43. The vent valve 42 is contained in a chamber 44 which is in constant communication with the brake pipe 10 through passages 45, 46, 13 and 14. A spring 47 in chamber 44 acts on the vent valve 42 for urging same into engagement with a seat rib 48 to close communication from chamber 44 to chamber 49 which is open to the atmosphere through a passage 50.

The vent valve piston 41 has at one side a chamber 51 connected by a passage 52 to the seat of the main slide valve 18, and has at the opposite side a chamber 53 open to the atmosphere through chamber 49 and passage 50. A blow-down timing port 54 through the piston 41 connects chambers 51 and 53 while a leakage groove 55 provided in the wall of the piston bore also connects said chambers when said piston is in its normal position, as shown in the drawing.

The operation of the parts of the brake equipment so far described is as follows:

When the brake pipe 10 is charged with fluid under pressure, fluid under pressure flows therefrom through pipe 9 and passage 14 to passage 13 from whence it flows in a direction toward the left-hand to the emergency piston chamber 12 and in the opposite direction to the service portion (not shown) of the equipment.

The service portion of the equipment is arranged to operate upon an increase in pressure in brake pipe 10 to supply fluid under pressure to the emergency reservoir 6 for charging same and to establish communication through which fluid under pressure is released from the brake cylinder device 8 for releasing the brakes, and is also operative upon both a service and an emergency reduction in pressure in brake pipe 10 to supply fluid under pressure from the auxiliary reservoir (not shown) to a passage 56 and thence to brake cylinder device 8 for applying the brakes in the same manner as described in the aforementioned patent, which operation however is not pertinent to the invention.

With the parts of the emergency valve device 2 in the normal position, as shown in the drawing, fluid under pressure supplied to piston chamber 12 upon an increase in pressure in the brake pipe 10 flows through a restricted feed port 57 to passage 17 and thence to the emergency valve chamber 15 and quick action chamber 16 for charging said chambers with fluid at brake pipe pressure.

With the parts of the emergency valve device in their normal position shown in the drawing, passage 52 which leads to the vent valve piston chamber 51 is lapped by the main slide valve 18. The piston chamber 51 being open to the atmosphere through port 54 and leakage groove 55 is therefore at atmospheric pressure which permits spring 47 to seat the vent valve 42 against seat rib 48. With the vent valve 42 seated, the vent valve chamber 44 is charged with fluid supplied from the brake pipe 10 through passages 14, 13, 46 and 45.

When a service reduction in brake pipe pressure is effected to effect a service application of brakes, a corresponding reduction in pressure occurs in the emergency piston chamber 12. Fluid under pressure then tends to flow back from valve chamber 15 and quick action chamber 16 through the feed port 57 to the piston chamber 12, but this feed port is so restricted that a differential of pressures develops on the opposite sides of the piston 11 upon a service reduction in brake pipe pressure.

When this differential increases to a certain degree, such for example as five-tenths of a pound per square inch, the piston 11, assuming its frictional condition and that of auxiliary slide valve 19 to be normal, moves toward the right-hand and shifts the auxiliary slide valve to service position in which a service port 58 in the auxiliary slide valve registers with a port 59 in the main slide valve 18, which port 59 registers with an atmospheric passage 60. Through this communication, fluid under pressure is then vented from the valve chamber 15 and quick action chamber at a rate corresponding to the service rate of reduction in brake pipe pressure effective in piston chamber 12 so as to thereby limit the pressure differential on the piston 11, to such a degree as to prevent movement of these parts past service position. Moreover, in service position of the auxiliary slide valve, the plunger 23 engages the end of the main slide valve 18 so that further movement of the piston 15, that is in the direction of the right-hand past service position, is opposed by the pressure of spring 24 acting on said plunger.

The spring 24 is provided to act in conjunction with the service venting of fluid under pressure from the quick action chamber 16 through ports 58 and 59 to prevent movement of the emergency piston 11 and auxiliary slide valve 19 past the service position upon a service reduction in brake pipe pressure and this is normally accomplished since the spring 24 is so designed as to require an increase in the pressure differential on the piston of for instance seven-tenths of a pound per square inch, to overcome the spring so that the piston may continue to move. By means of the service venting of fluid under pressure from the valve chamber 15 and this stabilizing action of spring 24, movement of the emergency valve piston and auxiliary slide valve past service position upon a service reduction in brake pipe pressure is therefore prevented when the frictional characteristics of the piston and auxiliary slide valve are of a substantially normal value.

When an emergency reduction in brake pipe pressure is effected, the rate of reduction in pressure in piston chamber 12 so exceeds the restricted venting capacity of service ports 58 and 59 to reduce the pressure in valve chamber 11 and quick action chamber 16, that the differential of pressures on the emergency piston 11 promptly increases sufficiently to overcome the pressure of the stabilizing spring 24 whereupon said piston moves the auxiliary slide valve 19 further relative to the main slide valve 18 to an emergency position which is defined by engagement of shoulder 22 on the piston stem 20 with the left-hand end of the main slide valve 18.

In emergency position of the auxiliary slide valve 19, a port 61 in the main slide valve is opened to valve chamber 15 which permits fluid under pressure to flow from said valve chamber and the quick action chamber 16 to passage 52 and thence to the vent valve piston chamber 51.

This supply of fluid under pressure to the vent valve piston chamber 51 so exceeds the venting capacity of the timing port 54 through the piston 41 and of the leakage groove 55 around said piston that a sufficient pressure is promptly attained on said piston to move the vent valve 42 away from seat rib 48 against the opposing pressure of fluid and of spring 47 in chamber 44. With the vent valve 42 unseated, fluid under pressure is suddenly vented from the brake pipe 10 through pipe 9, passages 14, 13, 46, and 45, chambers 44 and 49 and thence to the atmosphere through passage 50. The resultant sudden reduction in brake pipe pressure in the emergency piston chamber 12 increases the differential of pressures on the emergency piston 11 to a degree sufficient for causing said piston to move the main slide valve 18 to a position defined by engagement of said piston with a gasket 62.

In this position of the main slide valve 18, a cavity 63 therein connects the emergency reservoir passage 39 to a passage 64 which leads to the brake cylinder pipe 7, so that fluid under pressure then flows from the emergency reservoir 6 to the brake cylinder device 8 and equalizes therein to provide high emergency brake cylinder pressure and thereby an emergency application on the brakes.

In this position of the emergency slide valve 18 passage 52 is opened past the left-hand end of said slide valve directly to the valve chamber 15 so that the supply of fluid from the valve chamber 15 and quick action chamber 16 to the vent valve piston chamber 51 is maintained.

When the vent valve 42 is unseated by piston 61 said piston is moved into sealing engagement with a gasket 65 so as to prevent leakage of fluid under pressure around said piston from chamber 51 to chamber 53. As a result, the fluid under pressure supplied to chamber 51 is permitted to gradually reduce by flow through the timing port 54 to chamber 53 and thence to the atmosphere through passage 50.

The size of the timing port 54 is so related to the volumes of the valve chamber 15 and quick action chamber 16 that the supply of fluid from said chambers will act to hold the vent valve piston 41 in the position in which the vent valve 42 is unseated for a period of time sufficient to insure substantially complete venting of fluid under pressure from the brake pipe 10.

When the pressure of fluid in chamber 51 becomes sufficiently reduced to be overcome by the opposing pressure of spring 47, said spring acts to seat the vent valve 42 and return the piston 41 to its normal position, so that, when desired, the pressure in brake pipe 10 may be increased for effecting a release of brakes and for recharging the brake equipment, which will now be described.

When it is desired to effect a release of an emergency application of brakes, fluid under pressure is supplied to brake pipe 10 and thence flows to piston chamber 12. It is customary in charging the brake pipe to initially supply fluid at the high pressure in the usual main reservoir (not shown) provided on the locomotive directly to the brake pipe, and then after a certain lapse of time to supply fluid at a reduced pressure supplied by the usual feed valve device (not shown) to the brake pipe.

The initial supply of fluid at high pressure to the brake pipe 10 causes a rapid increase in pressure in the emergency piston chamber 12 which moves the emergency piston 11 and thereby the slide valves 18 and 19 back to their normal position shown in the drawing. In this position of piston 11 fluid under pressure supplied to chamber 12 flows through the feed port 57 to chambers 15 and 16, but this feed port is so restricted with respect to the initial rapid increase in brake pipe pressure that the differential of pressures on the piston 11 increases to a degree which overcomes the pressure of spring 29 on the stop 28, whereupon the piston moves the slide valves 18 and 19 further toward the left-hand to a back dump position, as defined by engagement between the left-hand face of said piston and the casing.

In this back dump position cavity 63 in the main slide valve 18 connects the brake cylinder passage 64 to a passage 66 so that fluid under pressure then flows from the brake cylinder device 8 to passage 66 and thence past two serially arranged check valves 67 and 68, through a passage 69 to passage 45 and thence through passage 46, 13, 14, and pipe 9 to the brake pipe 10.

This back dumping of fluid under pressure from the brake cylinder device 8 to the brake pipe 10 effects a sudden local increase in brake pipe pressure to provide a sufficient increase in the brake pipe pressure on the next car in a train to effect back dump operation of the emergency valve device on that car. In this manner the emergency valve devices throughout a train operate serially to provide a material increase in brake pipe pressure.

In the back dump position of the emergency valve device fluid supplied from the brake pipe to piston chamber 12 continues to flow through port 57 to the valve chamber 15 and quick action chamber 16. When the pressure of fluid in these chambers is thus increased sufficiently, the pressure of spring 29 on the movable stop 28 returns the piston 11 and slide valves 18 and 19 to their normal position shown in the drawing, in which position said chambers continue to charge through the feed port 57 until the pressure therein equalizes with that in the brake pipe.

In case the chambers 15 and 16 tend to become charged to a pressure higher than normally carried in the brake pipe 10, as may occur when fluid at the high pressure in the main reservoir on the locomotive is supplied to the brake pipe for too long a period of time, two serially arranged check valves 70 and 71 will unseat to permit flow of fluid from said chambers to passage 40 and thence to the emergency reservoir 6 which will be at a lower pressure at this time and which is also of relatively large volume and therefore capable to receive any excess pressure attained in said chambers which are of relatively small volume.

As above described, when the static frictional condition of the emergency piston 11 and auxiliary slide valve 19 is substantially normal, about a five-tenths pound per square inch differential in pressures is required on said piston to move same and the graduating valve out of their normal positions to service position. Another seven-tenths pounds per square inch differential is then required on the piston to compress the stabilizing spring 24 and permit movement of the graduating valve to emergency position, or in other words, about a one and two-tenths pounds per square inch differential is normally required on said piston to move these parts to emergency position. The emergency valve device will usually operate as intended, as above described, upon a service reduction in brake pipe pressure when the differential required to move the piston and auxiliary slide valve does not exceed the one and two-tenths pounds per square inch just mentioned, but when greater, or in case the kinetic friction of the parts remains sufficiently low with a relatively great increase in static resistance to movement, undesired movement of these parts through service position to emergency position may occur upon a service reduction in brake pipe pressure, and as a result an undesired emergency application of brakes on a train would be effected.

In order to prevent undesired emergency operation of the emergency valve device upon a service reduction in brake pipe pressure, due to a greater than normal static resistance to movement of the emergency piston and auxiliary slide valve out of their normal release positions, I provide an arrangement which acts on the emergency piston tending to urge same to service position with a force which preferably is just less than sufficient to overcome the normal static resistance to movement of the piston and auxiliary slide valve and thus arranged to off-set any ordinary increase in friction of said piston and valve due to the accumulations of foreign matter, lack of lubrication, use of improper lubricants or the like.

This arrangement comprises two permanently magnetized elements or magnets 72 and 73 arranged with like poles adjacent each other so as to provide a force urging or repelling one from the other. The magnet 72 I mount in any suitable part of the emergency valve device, such as the movable stop 28, the position of which remains fixed while effecting an application of brakes. The other magnet 73 I mount preferably in the end of the emergency piston stem 20 in alignment with the magnet 72 and in such a manner as to be spaced from the latter a slight distance, such as one sixty-fourth of an inch, when the parts of the emergency valve device are in their normal release positions as shown in the drawing.

These magnets may be so designed that with this gap between them, a force will be exerted on the emergency piston 11 urging same in the direction of service position equal to for instance four-tenths of a pound per square inch differential of fluid pressures on said piston. This force is therefore slightly less than required to overcome the normal static resistance to movement of the piston and auxiliary slide valve so as not to interfere with the operation thereof when their frictional characteristics are normal.

However, if the frictional resistance of the piston and auxiliary slide valve increases to a degree above normal the repelling force of magnet 72 on magnet 73 will off-set such increase up to the degree of such force. As above mentioned, if the frictional characteristics of the piston and auxiliary slide valve become changed in service to any extent which requires a differential in fluid pressures on the piston which exceeds one and two-tenths pounds per square inch to start the piston moving toward service an undesired emergency application of brakes may occur. However with magnets 72, 73 producing a force equal to four-tenths of a pound per square inch differential in fluid pressures on the piston, the differential in fluid pressures required on the piston to start it moving, under this frictional condition, need therefore only be eight-tenths of a pound per square inch. This magnetic repelling force then quickly reduces and substantially disappears with a slight increase in the gap or distance between the two magnets, so that the force which continues movement of the piston after it is once started will be promptly reduced to only the eight-tenths of a pound differential in fluid pressures on the piston.

The magnets thus provide a force which merely acts to get the piston started out of release position and then promptly reduces to a negligible degree so that the action of the stabilizing spring and the venting of fluid under pressure from the quick action chamber as above described will be effective to stop the piston and auxiliary slide valve in the service position against the remaining eight-tenths pound differential in fluid pressure on the piston, which differential is even less than the heretofore permissible value.

It will thus be seen that by the use of the invention undesired emergency operation of the valve device is no more likely to occur if the static resistance to movement of the piston and slide valve 19 is such as to require a one and six-tenths pounds differential of fluid pressures on the piston to start the piston moving than if a one and two-tenths pounds differential is required on the piston to start it moving without the use of the magnets.

It will further be seen that if the static resistance to movement of the piston and auxiliary slide valve out of release position is such as to require a differential of fluid pressures of any degree less than the one and six-tenths pounds per square inch the repelling action of the magnets will cause more prompt response of the emergency valve device to a service reduction in brake pipe pressure as well as to an emergency reduction in brake pipe pressure. This quicker response to a service reduction in brake pipe pressure is of no material consequence, but the quicker response to an emergency reduction in brake pipe pressure will provide quicker operation of the quick action piston 41 and brake pipe vent valve 42 and thereby a quicker emergency application of brakes on the car and a faster serial propagation of the emergency reduction in brake pipe pressure through a train, as is very desirable.

If the static frictional condition of the emergency piston and auxiliary slide should be such as to require a force for overcoming same equal to the repelling force of magnet 72 and 73, it will be seen that the piston will operate upon a very slight reduction in brake pipe pressure and this will be satisfactory, but if such force is less than the repelling force of the magnets such repelling force will tend to move the piston 11 and auxiliary slide valve in the direction of their service positions without any reduction in brake pipe pressure. This latter condition will not however result in any undesired brake operation since the movement of piston 11 under the action of the repelling force of the two magnets will merely close the charging port 57 for valve chamber 15 and quick action chamber 16 and open the vent from said chambers through the port 58 in the auxiliary slide valve and port 59 in the main slide valve. A slight venting of fluid under pressure from these chambers will then occur until the pressure in the chambers is reduced sufficiently below brake pipe pressure on the opposite side of the piston for the piston to move in the direction of its release position against the repelling force. This movement will close the vent from the valve chamber 15 and reopen the charging port 57. The valve chamber 15 and quick action section chamber 16 will then recharge with fluid under pressure from the brake pipe and the piston 11 and auxiliary slide valve 19 may then move again to service position and effect further venting of fluid under pressure from these chambers. In other words, with this low static frictional condition, the piston 11 and auxiliary slide valve 19 may move back and forth between release and service positions, without however effecting any undesired brake operation.

As a furtherance of the invention a permanent magnet 74 may be applied to the end of the main slide valve 18 adjacent the movable stop 28 and an opposing permanent magnet 77 may be applied to said stop, in order to provide a force on the main slide valve 18 when in its release position to off-set a certain degree of static friction of said valve and thereby provide for quicker movement of said valve upon an emergency reduction in brake pipe pressure and as a result, attain an application of the brakes on a car quicker than otherwise could be obtained.

With the main slide valve 18 in its release position shown in the drawing, only a relatively small gap is provided between the magnets 74 and 77 so as to thereby attain the desired repelling force for urging the main slide valve 18 in the direction of piston 11. The gap between the magnets 74 and 77 will increase upon movement of the slide valve 18 so that the magnets are thus operative only to aid the piston 11 in starting the slide valve 18 against static friction, since a slight movement of the slide valve will increase the gap between the magnets to a degree where the repelling forces between the magnets substantially disappears.

The degree of repelling force applied by the magnets 74 and 77 to the main slide valve 18 is less than the minimum force ever required to cause movement of said valve in order to insure that the valve will remain in its release position shown at all times except when an emergency application of brakes is desired.

It will now be seen that the desirable result from use of magnets 74 and 77 in conjunction with the improvements resulting from use of magnets 72 and 73 will provide for quicker stopping of a train in an emergency, as is very desirable.

If desired, the magnets 72 and 77 might constitute two spaced or opposite portions of a single magnet of ring form encircling the end of the piston stem 20 and secured in the movable stop 28, as shown in the drawing.

*Summary*

From the above description it will now be seen that I have provided means in the form of two opposing permanent magnets arranged to offset a certain degree of static friction of a slide valve and/or piston so that for a certain frictional condition, the slide valve and/or piston will be capable of movement by a lesser differential in fluid pressures on the piston than otherwise would be necessary to start the parts moving. Once moving however the piston will usually be able to maintain such movement under the differential of fluid pressures alone, due to the lower kinetic friction of the parts. Thus the magnets are effective merely to start movement, and their effect quickly disappears upon slight separation of the magnets.

The use of magnets in connection with an emergency piston and graduating valve thus assures proper operation thereof upon a service reduction in brake pipe pressure under abnormal static frictional conditions, and regardless of the frictional condition of these parts provides for quicker operation of the brake pipe vent valve on a car and thereby faster serial transmission of emergency action through a train.

The invention as applied to the main slide valve 18 of the emergency valve device provides for attaining a quicker emergency application of brakes on a car and this in conjunction with the faster serial transmission of emergency action through a train due to action of magnets 72 and 73, provides for obtaining a quicker application of brakes on all cars of a train in response to an emergency reduction in brake pipe pressure and thereby quicker stopping of the train than could otherwise be attained in an emergency.

Having now described my invention, what I claim as new and desire to secure by Letters Patent is:

1. In combination, a slide valve, a movable abutment connected to said valve and subject on opposite faces to pressure of fluid and operative to move said valve upon creation of a differential between the fluid pressures on said opposite faces, a relatively fixed magnet, and a magnet arranged in opposing relation to said fixed magnet and associated with said slide valve to provide a force which coacts with said differential to move said slide valve.

2. In combination, a slide valve, a piston connected to said slide valve and subject on opposite faces to pressure of fluid and adapted to be operated upon a differential between such pressures to move said slide valve in one direction, a relatively fixed permanent magnet, a permanent magnet associated with said piston in cooperative and opposing relation to said fixed magnet, the repelling forces between said magnets being operative on said piston to coact with said differential in fluid pressure for moving said piston and slide valve.

3. In combination, a slide valve, a piston connected to said slide valve and subject on opposite faces to pressure of fluid and adapted to be operated upon a differential between such pressures to move said slide valve in one direction, a relatively fixed magnet, and a magnet associated with said piston in cooperative and opposing relation to said fixed magnet, the repelling force between said magnets cooperating with the differential of fluid pressures on said piston for moving said piston and slide valve and said repelling force being less than the force required to overcome the normal static friction of said piston and slide valve.

4. In a fluid pressure brake in combination, a brake pipe, a slide valve, a piston subject to the opposing pressures of said brake pipe and a chamber, a stem connecting said piston and slide valve for moving said slide valve with said piston, said piston being arranged to operate upon a reduction in brake pipe pressure to move said slide valve from a normal position, a relatively fixed permanent magnet, and a permanent magnet associated with said piston stem in cooperative and opposing relation to said fixed permanent magnet to provide a repelling force between said magnets which coacts with the differential in fluid pressures on said piston created by a reduction in brake pipe pressure to move said piston and slide valve.

5. In a fluid pressure brake, in combination, a brake pipe, a piston subject to the opposing pressures of said brake pipe and a chamber, a slide valve connected to said piston and arranged to be moved from a normal position by said piston upon a reduction in brake pipe pressure to a degree below the pressure of fluid in said chamber, a permanent magnet movable with said slide valve, and a relatively fixed permanent magnet arranged in cooperative relation with the movable magnet said magnets having like poles adjacent each other to provide a repelling force on said slide valve for cooperating with a differential in fluid pressures created on said piston upon a reduction in brake pipe pressure to move said piston and slide valve out of its normal position.

6. In a fluid pressure brake in combination, a brake pipe, a piston subject to the opposing pressures of said brake pipe and a chamber, a slide valve in said chamber, a piston stem connecting said piston to said slide valve for rendering said piston operable to move said slide valve upon a reduction in pressure in said brake pipe to a degree below that in said chamber, a permanent magnet carried by said piston stem, a relatively fixed permanent magnet arranged in opposing relation to the first named magnet, the repelling forces between said magnets acting on said stem for cooperation with the differential in fluid pressures created on said piston upon a reduction in brake pipe pressure to move said slide valve.

7. In a fluid pressure brake, in combination, a brake pipe, a valve device comprising a casing, a piston in said casing subject to the opposing pressures of the brake pipe and a chamber, a main slide valve in said chamber, an auxiliary slide valve in said chamber mounted to slide on said main slide valve, a stem extending from said piston into said chamber and connected to said slide valves, said piston being operative upon a reduction in brake pipe pressure to a degree below that in said valve chamber to first move said auxiliary slide valve relative to said main slide valve and to then move said main slide valve, a relatively fixed permanent magnet in said casing, and a permanent magnet associated with said piston in opposing relation to said fixed magnet providing a force on said piston arranged to cooperate with a differential in fluid pressures thereon created by a reduction in brake pipe pressure for moving said piston and auxiliary slide valve relative to said main slide valve.

8. In a fluid pressure brake, in combination, a brake pipe, a valve device comprising a casing, a piston in said casing subject to the opposing pressures of the brake pipe and a chamber, a main slide valve in said chamber, an auxiliary slide valve in said chamber mounted to slide on said main slide valve, a stem extending from said piston into said chamber and connected to said slide valve, said piston being operative upon a reduction in brake pipe pressure to a degree below that in said valve chamber to first move said auxiliary slide valve relative to said main slide valve and to then move said main slide valve, a relatively fixed permanent magnet in said casing, a permanent magnet associated with said piston in opposing relation to said fixed magnet providing a force on said piston arranged to cooperate with a differential in fluid pressures thereon created by a reduction in brake pipe pressure for moving said piston and auxiliary slide valve relative to said main slide valve, a third permanent magnet having a relatively fixed position in said casing, and a fourth permanent magnet associated with said main slide valve and cooperative with said third magnet to provide a repelling force which acts on said main slide valve for cooperating with the differential in pressures created on said piston upon a reduction in brake pipe pressure for moving said main slide valve.

9. In a fluid pressure brake in combination, a brake pipe, a piston subject to the opposing pressures of said brake pipe and in a chamber, a main slide valve, an auxiliary slide valve mounted to slide on said main slide valve, a stem projecting from said piston into said chamber and having connections with said slide valves for moving said auxiliary slide valve from a normal position relative to said main slide valve and for then moving said main slide valve from a normal position upon a reduction in brake pipe pressure on said piston, said piston being operative upon an increase in brake pipe pressure at a certain rate to move said slide valves back to said normal position and at a faster rate past said normal position to an inner position, a member engaging said stem in said normal position of said valves, and movable by said stem to an inner position upon movement of said valves to their inner position, a spring acting on said member for opposing movement thereof and thereby of said piston and said valves to said inner position and for returning said piston and valves to their normal positions, a permanent magnet carried by said member, and another permanent magnet carried by said piston stem, said magnets being arranged to repell each other for providing a force on said piston to cooperate with the differential in fluid pressures created thereon upon a reduction in brake pipe pressure to actuate said piston for moving said auxiliary slide valve relative to said main slide valve.

10. In a fluid pressure brake in combination, a brake pipe, a piston subject to the opposing pressures of said brake pipe and in a chamber, a main slide valve, an auxiliary slide valve mounted to slide on said main slide valve, a stem projecting from said piston into said chamber and having connections with said slide valves for moving said auxiliary slide valve from a normal position relative to said main slide valve and for then moving said main slide valve from a normal position upon a reduction in brake pipe pressure on said piston, said piston being operative upon an increase in brake pipe pressure at a certain rate to move said slide valves back to said normal position and at a faster rate past said normal position to an inner position, a member engaging said stem in said normal position of said valves and movable by said stem to an inner position upon movement of said valves to their inner position, a spring acting on said member for opposing movement thereof and thereby of said piston and said valves to said inner position and for returning said piston and valves to their normal positions, a permanent magnet carried by said member, another permanent magnet carried by said piston stem, said magnets being arranged to repell each other for providing a force on said piston to cooperate with the differential in fluid pressures created thereon upon a reduction in brake pipe pressure to actuate said piston for moving said auxiliary slide valve relative to said main slide valve, a third permanent magnet carried by said member, and a fourth permanent magnet carried by said main slide valve said third and fourth permanent magnets being arranged to provide a repelling force which acts on said main slide valve to cooperate with the differential in fluid pressures provided on said piston for moving said main slide valve out of normal position.

PHILIP L. CRITTENDEN.